United States Patent
Liu et al.

(10) Patent No.: US 9,920,190 B2
(45) Date of Patent: Mar. 20, 2018

(54) MULTIMODAL POLYETHYLENE COMPOSITION WITH HIGH PRESSURE RESISTANCE

(71) Applicant: BOREALIS AG, Vienna (AT)

(72) Inventors: Yi Liu, Engerwitzdorf (AT); Alexandra Romina Albunia, Linz (AT); Tanja Piel, Linz (AT); Qizheng Dou, Linz (AT); Hermann Prokschi, Wartberg ob der Aist (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/323,915

(22) PCT Filed: Jul. 6, 2015

(86) PCT No.: PCT/EP2015/001374
§ 371 (c)(1),
(2) Date: Jan. 4, 2017

(87) PCT Pub. No.: WO2016/005044
PCT Pub. Date: Jan. 14, 2016

(65) Prior Publication Data
US 2017/0152376 A1 Jun. 1, 2017

(30) Foreign Application Priority Data

Jul. 7, 2014 (EP) .................................... 14002322

(51) Int. Cl.
| | | |
|---|---|---|
| *C08L 23/06* | (2006.01) | |
| *C08F 110/02* | (2006.01) | |
| *B29C 47/88* | (2006.01) | |
| *B29C 47/00* | (2006.01) | |
| *B29K 23/00* | (2006.01) | |
| *B29L 23/00* | (2006.01) | |

(52) U.S. Cl.
CPC .......... *C08L 23/06* (2013.01); *B29C 47/0004* (2013.01); *B29C 47/0023* (2013.01); *B29C 47/882* (2013.01); *C08F 110/02* (2013.01); *B29K 2023/065* (2013.01); *B29K 2023/0683* (2013.01); *B29L 2023/22* (2013.01); *C08F 2500/05* (2013.01); *C08F 2500/07* (2013.01); *C08F 2500/11* (2013.01); *C08F 2500/17* (2013.01); *C08L 2203/18* (2013.01); *C08L 2205/025* (2013.01); *C08L 2207/068* (2013.01)

(58) Field of Classification Search
CPC ................. C08L 23/06; C08L 2203/18; C08L 2205/025; C08L 2207/068; C08F 110/02; C08F 2500/05; C08F 2500/07; C08F 2500/17; C08F 2500/11; B29C 47/882; B29C 47/0023; B29C 47/0004; B29K 2023/0683; B29L 2023/22
See application file for complete search history.

(56) References Cited

U.S. PATENT DOCUMENTS

| 7,345,113 B2 | 3/2008 | Van Dun et al. |
| 2002/0045711 A1 | 4/2002 | Backman et al. |

FOREIGN PATENT DOCUMENTS

| EP | 0517868 B1 | 12/1992 |
| EP | 1985660 B1 | 10/2008 |
| EP | 2386584 A1 | 11/2011 |
| EP | 2743305 A1 | 12/2012 |
| EP | 2860202 A1 | 10/2013 |
| WO | 96/18677 A | 6/1996 |
| WO | 2006/092378 A1 | 9/2006 |
| WO | 2007/006327 A1 | 1/2007 |
| WO | 2007/042216 A1 | 4/2007 |

OTHER PUBLICATIONS

International Search Report and Written Opinion from International Application No. PCT/EP2015/001374 dated Sep. 15, 2015.
J. Randall, "A Review of High Resolution Liquid 13Carbon Nuclear Magnetic Resonance Characterizations of Ethylene-Based Polymers", Macromol. Chem. Phys. 1989, C29, pp. 201-317.
S. Filipe, "Non-linear rheological parameters for characterization of molecular structural properties in polyolefins", Proceedings of Annual European Rheology Conference, 2010, pp. 135.
J. Griffin, "Low-load rotor-synchronised Hahn-echo pulse train (RS-HEPT) 1H decoupling in solid-state NMR:factors affecting MAS spin-echo dephasing times", Magnetic Resonance in Chemistry, vol. 45, pp. S198-S208.

(Continued)

*Primary Examiner* — Michael C Miggins
(74) *Attorney, Agent, or Firm* — Roberts Mlotkowski Safran Cole & Calderon, P.C.

(57) ABSTRACT

The present invention relates to a multimodal polyethylene composition which can be manufactured into pipes showing improved pressure resistance comprising a high density multimodal ethylene polymer component (A) having a density of at least 930 kg/m³, and a MFR$_{21}$ of not more than 15 g/10 min, wherein said composition exhibits a LAOS-NLF defined as $$LAOS-NLF = \left|\frac{G'_1}{G'_3}\right|$$

where $G_1'$—first order Fourier Coefficient
$G_3'$—third order Fourier Coefficient
of at least 1.7. Such a polyethylene composition is useful for the manufacture of pressure pipes that exhibit improved pressure resistance and creep resistance and do not undergo sagging. Further disclosed is a process for the production of a pipe using such a multimodal polyethylene composition and a pipe comprising such a multimodal polyethylene composition.

14 Claims, No Drawings

(56) References Cited

OTHER PUBLICATIONS

Heino, "Rheological Characterization of Polyethylene Fractions", Theoretical and Applied Rheology, 1992, pp. 360-362.
K. Klimke, "Optimisation and Application of Polyolefin Branch Quantification by Melt-State 13C NMR Spectroscopy", Macromolecular Chemistry and Physics, 2006, pp. 382-395.
Huang, "Slow crack growth in blends of HDPE and UHMWPE", Polymer, 1992, vol. 33, pp. 2989-2997.
T. Kyu, "Cocrystallization and Miscibility Studies of Blends of Ultrahigh Molecular Weight Polyethylene with Conventional Polyethylenes", Journal of Applied Polymer Science, 1986, vol. 32, pp. 5575-5584.
K. Lim, "High-Density Polyethylene/Ultrahigh-Molecular-Weight Polyethylene Blend. I. The Processing, Thermal, and Mechanical Properties", Journal of Applied Polymer Science, 2005, vol. 97, pp. 413-425.
M. Parkinson, Effect of Branch Length on 13C NMR Relaxation Properties in Molten Poly[ethylene-co-(x-olefin)] Model Systems, Macromolecular Chemistry and Physics, 2007, vol. 208, pp. 2128-2133.
V. Busico, "Alk-1-ene Polymerization in the Presence of a Monocyclopentadienyl Zirconium(IV) Acetamidinate Catalyst: Microstructural and Mechanistic Insights" Macromolecular Rapid Communications, 2007, vol. 28, pp. 1128-1134.
P. Castignolles, "Detection and quantification of branching in polyacrylates by size-exclusion chromatography (SEC) and melt-state 13C NMR spectroscopy", Polymer 50, 2009, pp. 2373-2383.
X. Filip, "Heteronuclear decoupling under fast MAS by a rotor-synchronized Hahn-echo pulse train" Journal of Magnetic Resonance, 2005, vol. 176, pp. 239-243.
M. Pollard, "Observation of Chain Branching in Polyethylene in the Solid State and Melt via 13C NMR Spectroscopy and Melt NMR Relaxation Time Measurements", 2004, vol. 37, pp. 813-825.
A. Kaye, "Definition of Terms Relating to the Non-Ultimate Mechanical Properties of Polymers", International Union of Pure and Applied Chemistry, 1998, vol. 70, No. 3, pp. 701-754.
S. Filipe, "Non-Linear Rheology of Polymer Melts", AIP Conference Proceedings 2009, vol. 1152, pp. 168-174.
Wagner, "Rheotens-Mastercurves and Drawability of Polymer Melts" Polymer Engineering and Science, 1996, vol. 36, No. 7, pp. 925-935.
M. Wilhelm, "Fourier-Transform Rheology" Macromolecular Materials and Engineering, 2002, vol. 287, pp. 83-105.
Z. Zhou, "A new decoupling method for accurate quantification of polyethylene copolymer composition and triad sequence distribution with 13C NMR", 2007, vol. 187, pp. 225-233.
J. M. Dealy, "Melt Rheology and Its Role in Plastics Processing: Theory and Applications", 1990 (Abstract Only).
International Preliminary Report on Patentability of International Application No. PCT/EP2015/001374 dated Jan. 10, 2017.

MULTIMODAL POLYETHYLENE COMPOSITION WITH HIGH PRESSURE RESISTANCE

This invention concerns pipes comprising a multimodal polyethylene composition. In particular, the invention relates to pipes comprising a polyethylene composition comprising a high density multimodal polyethylene component and optionally an ultrahigh molecular weight polyethylene component. The invention also covers a process for producing the multimodal polyethylene composition.

Pipes constructed from polymer materials have a multitude of uses, such as fluid transport, i.e. the transport of liquids or gases, e.g. water or natural gas. During transport the fluid often is pressurised. Moreover, the transported fluid may have varying temperatures, usually within the range from about 0° C. to about 50° C. Such pressurised pipes are preferably constructed from polyolefins usually unimodal or bimodal polyethylene such as medium density polyethylene (MDPE; density: 0.930-0.942 g/cm$^3$) and high density polyethylene (HDPE; density: 0.942-0.965 g/cm$^3$).

The expression "pressure pipe" used herein refers to a pipe which, when used, is subjected to a positive pressure, that is the pressure inside the pipe is higher than the pressure outside the pipe.

Multimodal polyethylene polymers are well known in the art. A multimodal polyethylene system typically comprises a high molecular weight (HMW) component and a low molecular weight (LMW) component. The HMW component confers good mechanical properties to the system, whilst the LMW component provides good processability. Improved mechanical properties can be achieved by increasing the molecular weight of the HMW component. This, however, is usually achieved at the expense of a loss in homogeneity resulting from an increase in the viscosity ratio between the HMW and LMW components, which can in turn actually be detrimental to the mechanical properties attained.

Further improved mechanical properties are possible by including an ultra high molecular weight (UHMW) fraction into a multimodal polyethylene system. There are serious compatibility problems however, when such a high molecular weight species is added. For example, Ogunniyi et al (Journal of Applied Polymer Science, 2005, 97, 413-425) and Vadhar et al (Journal of Applied Polymer Science, 1986, 32, 5575-5584) both report the need for long blending times of the order of 15 minutes in a batch mixer when UHMW polyethylene was added to other polyethylenes.

The incorporation of UHMW polyethylene into a polyethylene composition as a copolymer is also known and is reported in, for example, WO 2007/042216, WO 96/18677 and WO 2006/092378.

The inclusion of UHMW polyethylene into HDPE via extrusion has also been investigated and has been carried out using a co-rotating twin screw extruder by Huang and Brown (Polymer, 1992, 33, 2989-2997). However, although the UHMW polyethylene particles were found to be well bonded in the matrix and this helped to slow down the rate of crack propagation, when analysed under SEM, the UHMW polyethylene was found to remain in large separate domains with no evidence of "melting" into the HDPE matrix. For these reasons, the amount of UHMW polyethylene is limited to low loadings.

There were further attempts to achieve pressure pipes that show improved pressure resistance in terms of mechanical properties.

In order to advance the performance of a pipe in terms of pressure resistance, a significant improvement in hydrostatic pressure resistance is required. Thus, either an increased intercept or a decreased slope of the ductility line is expected, if the material is subjected to a design stress rating according to ISO 9080:2003. In other words, when advancing the performance of a material from PE100, the composition must either have a higher stress resistance from the beginning of the test (increased intercept) or the slope of the ductility curve (applied stress in MPa vs. failure time in hours/years) must decrease. For Ziegler Natta bimodal HDPEs, this is challenging as failure time correlates positively with a material's stiffness/density and, by extrapolation, the required improvement in pressure resistance was not achievable up to now for a feasible stiffness/density of HDPE.

A further problem when manufacturing pipes, particularly large diameter pipes, is that it is difficult to maintain uniform dimensions around the pipe. That is due to gravity flow of the polymer melt, causing it to flow from an upper part of the pipe to a lower part (often called "sagging"). Thus, the wall thickness at the upper part of the pipe becomes smaller than at the lower part of the pipe. The sagging problem is particularly pronounced for thick-walled large diameter pipes.

US2002/045711 A1 proposes a multimodal polymer composition for pipes with a density of 0.930-0.965 g/cm$^3$, and a viscosity at a shear stress of 747 Pa (eta747 Pa) of at least 650 Pa·s. Pipes made of the multimodal polymer composition can withstand a stress of 8.0 MPa gauge during 50 years at 20° C. (MRS8.0). The pipes are said to have good sagging resistance. However a pipe with high end pressure resistance performance is not achievable with the described polyethylene composition.

U.S. Pat. No. 7,345,113 discloses bimodal polyethylene compositions and articles made therefrom. For the preparation of the compositions a single-site polymerization catalyst was used to obtain a narrow molecular weight distribution and a reverse comonomer distribution. While improved hydrostatic pressure resistance is reported, the narrow molecular weight distribution cannot achieve advanced processability and mechanical properties at the same time.

Therefore it is an object of the present invention to provide a new ethylene polymer composition which can be manufactured into pipes showing improved pressure resistance, and which pipes do not undergo sagging.

It is the finding of the present invention that a multimodal ethylene polymer composition comprising a high density multimodal polyethylene component, optionally blended with an ultrahigh molecular weight polyethylene resin (UHMWPE) can achieve the above objects. Accordingly, such an ethylene polymer composition is highly useful for the manufacture of pipes, especially pressure pipes that exhibit improved pressure resistance and creep resistance and do not undergo sagging.

According to a first aspect the present invention relates to a multimodal ethylene polymer composition comprising a high density multimodal ethylene polymer component (A) having a density of at least 930 kg/m$^3$, and a MFR$_{21}$ of not more than 15 g/10 min, wherein said composition exhibits a LAOS-NLF defined as $$LAOS-NLF = \left| \frac{G'_1}{G'_3} \right|$$

where $G_1'$—first order Fourier Coefficient
$G_3'$—third order Fourier Coefficient
of at least 1.7, preferably at least 2.0 and more preferably at least 3.0.

Large amplitude oscillatory shear (LAOS) is a very sensitive and at the same time simple characterization method being commonly used in the scientific literature. In this method a single excitation frequency is applied and the torque response is analysed. The non-linear response generates mechanical higher harmonics at (3, 5, 7, ... ). Fourier Transform analysis allows recovery of intensities and phases. As the intensity of the higher harmonics decreases rapidly, which can lead to very low values of the $5^{th}$ and higher harmonics, the ratio of the $$LAOS-NLF = \left| \frac{G'_1}{G'_3} \right|$$

where $G_1'$—first order Fourier Coefficient
$G_3'$—third order Fourier Coefficient
provides the most reliable characterization of the polymer structure.

High LAOS-NLF values indicate an increased non-linear behaviour of the respective composition. In the polyethylene composition of the invention this non-linear behaviour may be promoted by a high degree of long chain branching.

The multimodal ethylene polymer composition of the invention preferably has a density according to ISO 1183 at 23° C. of at least 925 kg/m³, more preferably 935 kg/m³, even more preferably at least 942 kg/m³, The upper limit for density may be 970 kg/m³, preferably 965 kg/m³, especially 960 kg/m³. A highly preferred density range is 940 to 965 kg/m³, especially 942 to 960 kg/m³.

The $MFR_{21}$ according to ISO 1133 at a load of 21.6 kg and at 190° C. of the polyethylene composition of the invention is preferably in the range of 0.05 to 10 g/10 min, preferably 0.1 to 8 g/10 min, especially 0.2 to 5 g/10 min.

The polyethylene composition preferably has an $MFR_5$ at a load of 5 kg and at 190° C. of less than 1.0 g/10 min, preferably less than 0.5 g/10 min, even more preferably less than 0.2 g/10 min.

The multimodal ethylene polymer composition preferably has a viscosity at a shear stress of 747 Pa (eta747) of 1000 kPa·s or higher, more preferably 3000 kPa·s or higher, even more preferably 10,000 kPa·s or higher as determined by the eta747 creep test described in the experimental section.

Preferably, the multimodal ethylene polymer composition of the invention exhibit values of XHI (xylene hot insoluble content) of 10% or less, more preferably 5% or less and even more preferably 1% or less.

The multimodal ethylene polymer composition of the invention comprises a high density multimodal ethylene polymer component (A) having a density of at least 930 kg/m³ according to ISO 1183 at 23° C. The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The composition of the invention comprises a high density multimodal polyethylene which may be the high density multimodal ethylene polymer component (A) described above or may further include the ultrahigh molecular weight polyethylene (B) described below. The high density multimodal polyethylene is preferably present in an amount of 55 to 99.9 wt. %, such as 75 to 99 wt. %, preferably 80 to 98 wt. %, based on the weight of the total composition. In preferred embodiments, any of the above lower limits can be combined with any of the above upper limits.

The Mw/Mn of the high density multimodal polyethylene may be at least 4, such as at least 10, preferably within a range of from 10 to 40.

In all embodiments of the invention, it is preferable that the high density multimodal polyethylene is a multimodal ethylene polymer composition comprising at least (i) a lower weight average molecular weight (LMW) ethylene homopolymer or copolymer component, and (ii) a higher weight average molecular weight (HMW) ethylene homopolymer or copolymer component. Preferably, at least one of said LMW and HMW components is a copolymer of ethylene with at least one comonomer. It is preferred that at least said HMW component is an ethylene copolymer. Alternatively, if one of said components is a homopolymer, then said LMW is the preferably the homopolymer.

Said LMW component of multimodal polymer preferably has a $MFR_2$ of at least 30 g/10 min, preferably at least 50 g/10 min, more preferably at least 100 g/10 min, even more preferably at least 250 g/10 min according to ISO 1133 at a load of 2.16 kg at 190° C.

The density of LMW component of said multimodal polymer may range from 950 to 980 kg/m³, e.g. 965 to 980 kg/m³ according to ISO 1183 at 23° C.

The LMW component of said multimodal polymer may form from 30 to 70 wt. %, e.g. 40 to 60 wt. % of the multimodal polymer with the HMW component forming 70 to 30 wt. %, e.g. 60 to 40 wt. %. In one embodiment said LMW component forms 50 wt. % or more of the multimodal polymer as defined above or below. Typically, the LMW component forms 45 to 55% and the HMW component forms 55 to 45% of the blend.

The HMW component of said multimodal ethylene polymer has a lower $MFR_2$ and lower density than the LMW component.

The high density multimodal ethylene polymer component (A) of the invention may be an ethylene homopolymer or copolymer. By ethylene homopolymer is meant a polymer which is formed essentially only of ethylene monomer units, i.e. is 99.9 wt. % ethylene or more. It will be appreciated that minor traces of other monomers may be present.

The high density multimodal ethylene polymer component (A) of the invention may also be a copolymer (and is preferably a copolymer) and can therefore be formed from ethylene with at least one other comonomer, e.g. $C_{3-20}$ olefin. Preferred comonomers are alpha-olefins, especially with 3-8 carbon atoms. Preferably, the comonomer is selected from the group consisting of propene, 1-butene, 1-hexene, 4-methyl-1-pentene, 1-octene, 1,7-octadiene and 7-methyl-1,6-octadiene. The use of 1-hexene or 1-butene is most preferred.

The high density multimodal ethylene polymer component (A) of the invention can comprise one monomer or two monomers or more than 2 monomers. The use of a single comonomer is preferred. If two comonomers are used it is preferred if one is a $C_{3-8}$ alpha-olefin and the other is a diene as hereinbefore defined.

The amount of comonomer is preferably such that it comprises 0-3.0 mol %, more preferably 0.1-2.0 mol % and most preferably 0.1-1.5 mol % of the ethylene polymer. Values under 1.0 mol % are also envisaged, e.g. 0.1 to 1.0 mol %. These can be determined by NMR as described in the experimental section.

It is preferred however that the multimodal ethylene polymer composition of the invention comprises a LMW homopolymer component and a HMW ethylene copolymer component, especially preferred an ethylene hexene copolymer or an ethylene butene copolymer.

For the preparation of the multimodal ethylene polymer composition of the present invention polymerisation methods well known to the skilled person may be used. It is within the scope of the invention for a multimodal, e.g. at least bimodal, polymers to be produced by blending each of the components in-situ during the polymerisation process thereof (so called in-situ process) or, alternatively, by blending mechanically two or more separately produced components in a manner known in the art.

Polyethylene useful in the present invention is preferably obtained by in-situ blending in a multistage polymerisation process. Accordingly, polymers are obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the polyethylene polymer used in the compositions of the invention is produced in a polymerization process having at least two polymerisation stages using a single site catalyst or Ziegler Natta catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor-gas phase reactor system is well known as Borealis technology, i.e. as a BORSTAR™ reactor system. Such a multistage process is disclosed e.g. in EP 0 517 868 B1.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomers to be polymerized, e.g. ethylene.

Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

A specifically preferred polymerization catalyst is a LYNX 200 available from Engelhard Belgium BVBA, Heverlee, Belgium.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 80 to 110° C., more preferably is 90 to 100° C., and most preferably is 92 to 98° C., and the temperature in the gas-phase reactor preferably is 70 to 105° C., more preferably is 75 to 100° C., and most preferably is 85 to 97° C.

A chain-transfer agent, preferably hydrogen, is added as required to the reactors. Preferably the hydrogen/ethylene ratio is adjusted to a range of 100 to 650, more preferably 200 to 550 and most preferably 250 to 550 mol/kmol in the reaction, when the LMW fraction is produced and to a hydrogen/ethylene ratio in the range of 5 to 40, more preferably 10 to 35 most preferably 12 to 32 mol/kmol in the reaction when the HMW fraction is produced.

Further preferred polymerization conditions for preparing such a multimodal ethylene polymer are described in EP 1 985 660 A1, incorporated herein by reference in its totality.

The multimodal ethylene polymer composition according to the invention may preferably comprise, in addition to the above-described high density multimodal polyethylene component (A), an ultrahigh molecular weight polyethylene (UHMWPE) component (B) in an amount of from 0.1 to 45 wt. %, more preferably from 0.5 to 20 wt. %, even more preferably from 1 to 15 wt. %, based on the weight of the total composition. In preferred embodiments, any of the above lower limits can be combined with any of the above upper limits.

The UHMW polyethylene component (B) of the composition of the invention preferably has a nominal viscosity molecular weight (Mv) according to ASTM D 4020-05 in the range of from 1,000,000 to 6,000,000 g/mol.

The UHMW polyethylene component (B) of the invention is an ethylene homo- or copolymer. The UHMW component is also preferably unimodal. This means that it has a single peak on GPC (gel permeation chromatography). Ideally it is formed from a single component and is therefore produced in a single manufacturing step.

The UHMW polyethylene component (B) of the invention can be prepared by conventional processes. Preferably, the UHMW polyethylene is prepared using a Ziegler-Natta catalyst. These UHMW polymers are commercially available polymers (e.g. Jingchem Corporation, grade UHM-WPE-M2).

The UHMW polyethylene component (B) of the invention can also be prepared by in-reactor blending in the course of a multi-stage polymerization process using a plurality of reactors. In a preferred embodiment, the UHMW polyethylene component (B) may be prepared in a stage of the polymerization process preceding the preparation of the high density multimodal ethylene polymer component (A), e.g. in a slurry phase reactor, preferably a loop reactor. Alternatively, the UHMW polyethylene component (B) may also be prepared in a stage of the polymerization process following the preparation of the high density multimodal ethylene polymer component (A), e.g. in a gas phase reactor.

The density of the UHMW polyethylene component (B) can be in the range 920 to 960 kg/m$^3$, preferably 925 to 945 kg/m$^3$ according to ISO 1183 at 23° C.

This component typically has a very low MFR, such as an MFR$_{21}$ of less than 0.5 g/10 min, especially MFR$_{21}$ of less than 0.1 g/10 min, more especially less than 0.05 g/10 min. In many cases the MFR$_{21}$ of the UHMW polyethylene component cannot be measured because the molten polymer is so viscous that it will not flow out of the melt indexer.

The intrinsic viscosity of the UHMW polyethylene component (B) is preferably at least 9 dl/g, preferably at least 12 dl/g, such as at least 14 dl/g. The intrinsic viscosity of the UHMW component should preferably not exceed 32 dl/g, more preferably not exceed 25 dl/g.

The high density multimodal polyethylene composition of the invention which may include the above UHMWPE polyethylene component (B) may be prepared simply by mixing the components but to ensure homogeneity for maximum pipe performance it will be appreciated that the components have to be compounded in a compounding step prior to a pipe extrusion step. This can be achieved by any conventional method known to those skilled in the art, e.g. extrusion or kneading, preferably extrusion.

The pre-mixed material is then melt-mixed at a barrel temperature of 180 to 300° C., preferably in a continuous melt mixing device like a single screw extruder, a co-rotating twin screw extruder or a co-kneader.

The screw speed of the melt mixing device preferably is adjusted to a range from 80 to 450 rotations per minute (rpm), more preferably 80 to 200 rpm.

Following the melt-mixing step, the resulting polymer melt is pelletized either in an underwater pelletizer or after solidification of one or more strands in a water bath in a strand pelletizer. The pelletized material may be used for the manufacture of pipes, especially pressure pipes.

Accordingly, the present invention is further directed to a process for the production of a pipe comprising the steps of melt-mixing 55 to 99.9 wt. % of a high density multimodal ethylene polymer component (A) as described above, optionally together with 0.1 to 45 wt. % of an ultrahigh ethylene polymer component (B) as described above and extruding the mixture in the presence of up to 10 wt. % of additives, based on the extruded mixture so as to form a multimodal polyethylene composition having an MFR$_{21}$ of 15 g/10 min or less, a density of at least 930 kg/m$^3$ and a LAOS-NLF defined as $$LAOS-NLF = \left|\frac{G'_1}{G'_3}\right|$$

where $G_1'$—first order Fourier Coefficient
$G_3'$—third order Fourier Coefficient
of at least 1.7, preferably at least 2.0 and more preferably at least 3.0;

and forming said multimodal ethylene polymer composition into a pipe.

The process to produce the composition includes an extrusion step. The extruder is preferably a twin screw extruder, such as a co-rotating twin screw extruder or a counterrotating twin screw extruder. Co-rotating twin screw extruders are produced, among others, by Theysohn, Coperion and Japan Steel Works. Counter-rotating twin screw extruders are produced, among others, by Kobe Steel, Japan Steel Works and Farrel.

Screw designs known in the art may be used. It is important for the design that the melt temperature at the die does not increase to an excessively high level and preferably should be at most 310° C., more preferably not higher than 300° C. and even more preferably not higher than 290° C. Too high melt temperature may lead to degradation of the polymer and loss of mechanical properties. Extrusion conditions will be familiar to the skilled person. Appropriate temperatures include 220 to 240° C., such as 225 to 235° C. Screw speeds of 100 to 200 rpm, such as 100 to 150 rpm are appropriate. In general, slower throughput rates encourage homogeneity. Suitable extruder design is presented, for instance, in WO-A-2007/006327.

According to a preferred embodiment of the process of the invention the multimodal polymer and a free-radical generator are mixed and introduced into the feed port of the extruder. The polymer is melted in the melting section of the extruder where the temperature increases and consequently the free-radical generator decomposes. The formed radicals react with the polymer to produce a modified polymer composition. The additives are introduced into the extruder downstream of the melting section, preferably within a distance I from the outlet die where I≤L/2, more preferably I≤L/3, wherein L is the total length of the screw.

According to another preferred embodiment of the process of the invention the multimodal polymer which does not contain antioxidants or stabilizers is introduced into the feed port of the extruder. The polymer is melted in the melting section of the extruder where the temperature increases. The polymer becomes subjected to thermal decomposition whereby polymer radicals are formed. Additionally, air may be introduced into the feed port of the extruder. Oxygen then contributes to the formation of free radicals. During the extrusion the polymeric radicals react with the polymer chains and thus a modified polymer composition is produced. The additives are introduced into the extruder downstream of the melting section according to the description above. According to the above-described extrusion processes long chain branches are formed in the polymer backbone. Such long-chain branched polyethylene has a greater value of LAOS-NLF, a greater value of eta$_{0.05}$ and a greater value of the ratio (eta$_{0.05}$)/(eta$_{300}$) compared to an otherwise similar resin without long-chain branches.

It will be appreciated that prior to forming the polyethylene composition of the invention, polymer components may be blended with standard additives and adjuvants known in the art. They may also contain additional polymers, such as carrier polymers of the additive masterbatches.

The properties of the components of the composition and the composition itself can be measured in the absence of or in the presence of any additives. It will be preferred that additives are present however when properties are determined.

Suitable antioxidants and stabilizers are, for instance, sterically hindered phenols, phosphates or phosphonites, sulphur containing antioxidants, alkyl radical scavengers, aromatic amines, hindered amine stabilizers and the compositions according to the present invention may contain compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl)propionate (sold, e.g., by Ciba Specialty Chemicals under the trade name of Irganox 1076) and 2,5,7,8-tetramethyl-2(4',8',12'-trimethyltridecyl)chroman-6-ol (sold, e.g., by BASF under the trade name of Alpha-Tocopherol).

Examples of phosphates and phosphonites are tris (2,4-di-t-butylphenyl) phosphite (sold, e.g., by BASF under the trade name of Irgafos 168), Commercially available blends of antioxidants and process stabilizers are also available, such as Irganox B225, Irganox B215 and Irganox B561 marketed by Ciba-Specialty Chemicals.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch (CBMB) containing 39.5 wt. % carbon black (Elftex TP, distributed by Cabot), 0.1 wt. % Irganox 1010 (from Ciba, now part of BASF) and 60.4 wt. % ethylene-butylene copolymer having a comonomer content of 1.7 wt. %, an $MFR_2$ (2.16 kg, 190° C., ISO 1133) of 30 g/10 min and a density of 959 kg/m$^3$ in an amount of 5.75 wt. %. Then the mixture may be extruded to pellets in a counter-rotating twin screw extruder. Typically, compounding conditions as given in European patent application no. 13004878.8, Table 1 may be used. Also titanium oxide may be used as an UV-screener. It is particularly preferred that carbon black is present in the compositions of the invention, preferably in an amount of about 2.25% by weight.

Components (A) and (B) in the polymer composition of the invention can be further blended with any other polymer of interest or used on its own as the only olefinic material in an article. Thus, the ethylene polymer of the invention can be blended with known HDPE, MDPE, LDPE, LLDPE polymers. Ideally however any pipe made from the ethylene polymer composition of the invention consists essentially of the multimodal ethylene polymer composition which comprises at least the high density multimodal polyethylene component (A) and optionally the UHMWPE component (B) and any additives.

In the reactive compounding in the melt-mixing device a free-radical generator, such as a peroxide, may be added to produce a modified polymer composition. Suitable peroxides which may be used in the process of the present invention include acyl peroxides, dialkylperoxydicarbonates, (tert-alkyl)peroxyesters, (tert-alkyl, alkyl)monoperoxycarbonates, di(tert-alkyl)peroxyketals, di(tert-alkyl)-peroxides, (tert-alkyl)hydroperoxides and ketone peroxides. The free-radical generator may also be a mixture of two or more such compounds.

Examples of acyl peroxides are benzoyl peroxide, 4-chlorobenzoyl peroxide, 3-methoxybenzoyl peroxide and/or methyl benzoyl peroxide.

Examples of alkyl peroxides are allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylarminomethyl-t-butyl peroxide, dimethylaminomethyl-t-butyl peroxide, 1,1-di-(t-amylperoxy)cyclohexane, t-amyl peroxide, t-butylcumyl peroxide, dicumyl peroxide, t-butyl peroxide and/or 1-hydroxybutyl n-butyl peroxide.

Examples of peroxyesters and carbonates are butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1) heptane percarboxylate, t-butyl-4-carbomethoxy perbutyrate, t-butylcyclobutane percarboxylate, t-butyl-cyclohexyl peroxycarboxylate, t-butylcyclopentyl percarboxylate, t-butyl-cyclopropane percarboxylate, t-butyldimethyl percinnamate, t-butyl-2-(2,2-di-phenylvinyl) perbenzoate, t-butyl-4-methoxy perbenzoate, t-butylperbenzoate, t-butyl-carboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

The multimodal polyethylene composition according to the present invention is preferably obtainable by pre-mixing in the presence of 0.01 to 1.0 wt-% peroxide, more preferably in the presence of 0.05 to 0.5 wt.-% peroxide. As the free-radical generator tert-butylperoxy isopropyl carbonate (CAS No. 2372-21-6) may be used, being commercially available as Trigonox® BPIC-C75 (Akzo Nobel, NL)—75% solution in mineral spirits.

It has been found as a particularly preferred embodiment of the invention to feed the additives at different zones in the extrusion step. Conventionally the additives are added together with the polymer components into the main hopper of an extruder. This is generally done at the upstream end or within 10% of the length from the upstream end of the extruder. However, it has been found that the polyethylene composition as obtained after extrusion has superior properties which makes them highly suitable for the manufacture of pressure pipes, if at least a part of the additives, preferably at least the antioxidant, is added in the extrusion step at a position situated within 50%, more preferably within 40%, even more preferably within 30% of the length from the downstream end of the extruder. It has been found that the extruded polyethylene compositions have improved rheological properties such as extremely increased eta747 values, and an improved non-linear behaviour expressed by higher LAOS-NLF values. Pipes manufactures from these polyethylene compositions show excellent creep resistance and sagging resistance and a good compromise between processability and mechanical properties even at increased molecular weights of the compositions.

The ethylene polymer composition according to the present invention further preferably has a F30 melt strength of 10 cN or higher, more preferably 20 cN or higher and most preferably 40 cN or higher at 200° C. and 100 bar, and a drawability of preferably at least 150 mm/s, more preferably at least 155 mm/s, even more preferably at least 160 mm/s, when being subjected to the Rheotens melt strength test as described in the experimental part.

The multimodal ethylene polymer composition of the invention exhibits remarkable shear thinning properties making them ideal for pipe formation. This behaviour is defined by the ratio $(eta_{0.05})/(eta_{300})$ of the complex viscosity, in Pa·s, at an angular frequency of 0.05 rad/s ($eta_{0.05}$), to the complex viscosity, in Pa·s, at an angular frequency of 300 rad/s ($eta_{300}$) and is preferably at least 190, more preferably at least 210, especially at least 220 or even at least 250. It is preferred that the ratio is not greater than 1000, more preferably not greater than 900 and in particular not greater than 800. The viscosity $eta_{0.05}$ may preferably be at least 250,000 Pa·s, more preferably at least 260,000 Pa·s, even more preferably at least 270,000 Pa·s or even at least 300,000 Pa·s. It is preferred that the viscosity $eta_{0.05}$ is not greater than 1,400,000 Pa·s, more preferably not greater than 1,200,000 Pa·s and in particular not greater than 1,000,000 Pa·s.

In the present invention the value of the ratio $(eta_{0.05})/(eta_{300})$ as well as the value of the viscosity $eta_{0.05}$ can be adjusted firstly by adjusting the molecular weights of the polymers produced in the different reactors of the polymerization process and their relative proportions, and secondly by suitable selection of the free-radical generator and its amount. Especially, using a more reactive free-radical generator or increasing the amount of the free-radical generator increases the viscosity $eta_{0.05}$ and also increases value of the ratio $(eta_{0.05})/(eta_{300})$.

If no free-radical generator is used, then the conditions in the extruder may be used to influence the ratio $(eta_{0.05})/(eta_{300})$ as well as the viscosity $eta_{0.05}$. Then a greater specific energy input into the extruder usually leads to greater value of $(eta_{0.05})/(eta_{300})$ and $eta_{0.05}$. In addition, air may be introduced into the extruder to increase $(eta_{0.05})/(eta_{300})$ and $eta_{0.05}$.

The compositions of the invention are used in the manufacture of pipes. The pipes comprise, preferably are made from the compositions of the invention as defined above. In the present invention the term "pipe" covers pipes as well as all supplementary parts for pipes such as fittings, valves, chambers and all other parts which are commonly necessary for a piping system. Pipes can be manufactured using various techniques such as RAM extrusion or screw extrusion. The actual pipe extrusion process is not meant by the above-described extrusion step for extruding the multimodal ethylene polymer composition of the invention.

Pipes according to the present invention are produced according to the methods known in the art from the polymer composition as described above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to still another method the extrudate leaving the die is directed into a tube having perforated section in the centre. A slight vacuum is drawn through the perforation to hold the pipe against the walls of the sizing chamber.

After the sizing the pipe is cooled, typically in a water bath having a length of about 5 meters or more.

It will be appreciated that many pipes are cross-linked however the pipes of the invention may also be non-crosslinked. Some degree of crosslinking can occur during the pipe extrusion process.

Expressed differently, the pipes of the invention are preferably able to withstand at least 30 h, more preferably at least 50 h, particularly preferably at least 70 h and especially preferably at least 90 h at 13.9 MPa in a hydrostatic pressure resistance test according to ISO 1167-1:2006, as described in the experimental section below. Test protocols (at 20° C.) for these tests are described in the experimental section below.

Pipes of the invention are preferably pressure pipes therefor. The pipes of the invention may be used for the transportation of fluids, such as tap water or natural gas, transported in a pipe often are pressurized and have varying temperatures, usually within a range of 0° C. to 50° C.

The pipe according to the invention show especially improved stiffness thus enabling the production of pipes with significantly increased minimum required strength (MRS) as reported above. In addition to the higher stiffness also improved sagging resistance can be seen from the eta747 shear viscosity results presented in the examples. The compositions used for the manufacture of the pipes of the invention can have an eta747 value at least 10 times higher, sometimes as much as 20 times higher than the HDPE component (A) alone.

The compositions of the invention still have advanced stiffness and impact properties. Thus, the compositions may preferably have a tensile modulus of at least 950 MPa, preferably at least 1050 MPa, determined according to ISO 527-2:1993. The compositions preferably exhibit a Charpy impact strength at 0° C. of at least 15 kJ/m$^2$, determined according to ISO179/1eA:2000.

The invention will now be described with reference to the following non-limiting examples.

EXAMPLES

1. Methods
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at a temperature of 190° C. and a load of 2.16 kg for $MFR_2$, at a load of 5.0 kg for $MFR_5$ and at a load of 21.6 kg for $MFR_{21}$.

b) Melting and Crystallisation Temperature

The melting and crystallisation temperature $T_m$ and $T_c$ are determined according to ISO 11357-3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature $T_c$ being determined in the cooling step and the $T_m$ melting temperature being determined in the second heating step.

c) Comonomer Content

Quantitative nuclear-magnetic resonance (NMR) spectroscopy was used to quantify the comonomer content of the polymers.

Quantitative $^{13}C\{^1H\}$ NMR spectra were recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probe head at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]) and the RSHEPT decoupling scheme {[4], [5]}. A total of 1024 (1k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$H=I^*_{B4}$

With no other signals indicative of other comonomer sequences, i.e. consecutive comonomer incorporation, the total 1-hexene comonomer content was calculated based solely on the amount of isolated 1-hexene sequences:

$H_{total}=H$

Characteristic signals resulting from saturated end-groups were observed. The content of such saturated end-groups was quantified using the average of the integral of the signals at 22.84 and 32.23 ppm assigned to the 2s and 3s sites respectively:

$S=(1/2)^*(I_{2S}+I_{3S})$

The relative content of ethylene was quantified using the integral of the bulk methylene (δ+) signals at 30.00 ppm:

$E=(1/2)^*I_{\delta+}$

The total ethylene comonomer content was calculated based on the bulk methylene signals and accounting for ethylene units present in other observed comonomer sequences or end-groups:

$E_{total}=E+(5/2)^*B+(3/2)^*S$

The total mole fraction of 1-hexene in the polymer was then calculated as:

$fH=(H_{total}/(E_{total}+H_{total})$

The total comonomer incorporation of 1-hexene in mole percent was calculated from the mole fraction in the usual manner:

$H[mol\text{-}\%]=100^*fH$

The total comonomer incorporation of 1-hexene in weight percent was calculated from the mole fraction in the standard manner:

$H[wt.\text{-}\%]=100^*(fH^*84.16)/((fH^*84.16)+((1-fH)^*28.05))$

REFERENCES

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Reson. 2005, 176, 239.
[5] Griffin, J. M., Tripon, C., Samoson, A., Filip, C., and Brown, S. P., Mag. Res. in Chem. 2007, 45, S1, S198.
[6] Castignolles, P., Graf, R., Parkinson, M., Wilhelm, M., Gaborieau, M., Polymer 50 (2009) 2373.
[7] Zhou, Z., Muemmerle, R., Qiu, X., Redwine, D., Cong, R., Taha, A., Baugh, D. Winniford, B., J. Mag. Reson. 2007, 187, 225.
[8] Busico, V., Carbonniere, P., Cipullo, R., Pellecchia, R., Severn, J., Talarico, G., Macromol. Rapid Commun. 2007, 28, 1128.
[9] J. Randall, Macromol. Sci., Rev. Macromol. Chem. Phys. 1989, C29, 201.

d) Density

Unless otherwise described, density of the polymer was measured according to ISO 1183-1:2004 Method A on compression moulded specimen prepared according to EN ISO 1872-2 (February 2007) and is given in kg/m³.

e) Molecular Weight

Mw, Mn and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/l 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \Sigma_i \cdot w_i Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the well-known mixing rule:

$$\frac{1}{Mnb} = \sum_i \cdot \frac{wi}{Mni}$$

where $Mn_b$ is the weight average molecular weight of the blend, $w_i$ is the weight fraction of component "i" in the blend and $Mn_i$ is the weight average molecular weight of the component "i".

Nominal viscosity molecular weight (Mv) is calculated from the intrinsic viscosity [η] according to ASTM D 4020-05

$$Mv = 5.37 \times 10^4 \times [\eta]^{1.37}.$$

f) Rheology

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression molded plates, using nitrogen atmosphere and setting a strain within the linear viscoelastic regime. The oscillatory shear tests were done at a temperature of 190° C. applying a frequency range between 0.01 and 628 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively, $\omega$ is the angular frequency, $\delta$ is the phase shift (loss angle between applied strain and stress response), t is the time.

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0} \cos\delta \text{ [Pa]} \quad (3)$$

$$G'' = \frac{\sigma_0}{\gamma_0} \sin\delta \text{ [Pa]} \quad (4)$$

$$G^* = G' + iG'' \text{ [Pa]} \quad (5)$$

$$\eta^* = \eta' - i\eta'' \text{ [Pa·s]} \quad (6)$$

$$\eta' = \frac{G''}{\omega} \text{ [Pa·s]} \quad (7)$$

$$\eta'' = \frac{G'}{\omega} \text{ [Pa·s]} \quad (8)$$

The values of storage modulus (G'), loss modulus (G"), complex modulus (G*) and complex viscosity (η*) were obtained as a function of frequency (w). Thereby, e.g. $\eta^*_{0.05\ rad/s}$ (eta*$_{0.05\ rad/s}$) is used as abbreviation for the complex viscosity at the frequency of 0.05 rad/s or $\eta^*_{300\ rad/s}$ (eta*$_{300\ rad/s}$) is used as abbreviation for the complex viscosity at the frequency of 300 rad/s.

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (10).

$$EI(x) = G' \text{ for}(G'' = x \text{ kPa})[\text{Pa}] \quad (9)$$

For example, the EI (5 kPa) is the defined by the value of the storage modulus G', determined for a value of G" equal to 5 kPa.

The determination ratio between different Eta* values is done, as described in equation (10).

$$\frac{Eta^* \text{ for } (G^* = x \text{ kPa})}{Eta^* \text{ for } (G^* = y \text{ kPa})} \text{ [Pa]} \quad (10)$$

According to the present invention, the ratio of the complex viscosity, in Pa·s, at a frequency of 0.05 rad/s (eta$_{0.05}$), to the complex viscosity, in Pa·s, at a frequency of 300 rad/s (eta$_{300}$) is determined.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "-Interpolate y-values to x-values from parameter" and the "logarithmic interpolation type" were applied.

The polydispersity index, PI, is defined by equation (11).

$$PI = \frac{10^5}{G'(\omega_{COP})}, \omega_{COP} = \omega \text{ for } (G' = G'') \quad (11)$$

where, $\omega_{COP}$ is the cross-over angular frequency, determined as the angular frequency for which the storage modulus, G' equals the loss modulus, G".

g) Shear Viscosity Eta747

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample. The conditions applied are generally described in ISO 6721-10:1999.

The creep test was performed on an Anton Paar MCR 501 stress controlled rotational rheometer, using a parallel plate geometry of 25 mm and setting a gap of 25 1.8 mm. Sample preparation was done by compression moulding at 200° C. The melting and pressure loading process used on the compression moulding, were done for a total time of 5 minutes. The creep test was done at 190° C., by the application of a constant shear stress, of 747 Pa. The measurement starting was set for a normal force of less than 3.5 N. The resulting response was monitored in terms of both deformation, γ and shear viscosity, η, over a total creep time of 1860 s. The so-called eta747 is the shear viscosity determined for a creep time of 1740 s.

The appropriate applied creep stress was previously determined by means of an oscillatory shear measurement, in order to ensure a creep response within the linear viscoelastic region.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362

[2] Definition of terms relating to the non-ultimate mechanical properties of 15 polymers, Pure & Appl. Chem., Vol. 70, No. 3, pp. 701-754, 1998.

h) LAOS Non-Linear Viscoelastic Ratio

The investigation of the non-linear viscoelastic behavior under shear flow was done resorting to Large Amplitude Oscillatory Shear. The method requires the application of a sinusoidal strain amplitude, $\gamma_0$, imposed at a given angular frequency, ω, for a given time, t. Provided that the applied sinusoidal strain is high enough, a non-linear response is generated. The stress, σ is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [1-3] can be expressed by a Fourier series, which includes the higher harmonics contributions:

$$\sigma(t, \omega, \gamma_0) = \gamma_0 \cdot \sum_n [G'_n(\omega, \gamma_0) \cdot \sin(n\omega t) + G''_n(\omega, \gamma_0) \cdot \cos(n\omega t)]$$

with, σ—stress response
t—time
ω—frequency
$\gamma_0$—strain amplitude
n—harmonic number
$G'_n$—n order elastic Fourier coefficient
$G''_n$—n order viscous Fourier coefficient The non-linear viscoelastic response was analysed applying Large Amplitude Oscillatory Shear (LAOS). Time and Strain sweep measurements were undertaken on an RPA 2000 rheometer from Alpha Technologies coupled with a standard biconical die. Approx. 3.2 grams' sample is conditioned for 4 mins at a temperature of 190° C., a frequency of 10.5 rad/s and a strain amplitude of 0.5% (time sweep). Thereafter the LAOS measurement starts. During the course of the measurement the test chamber is sealed and a pressure of about 6 MPa is applied. The LAOS test is done applying a temperature of 190° C., an angular frequency of 0.628 rad/s and at strain amplitudes of 50%, 100%, 300%, 500% and 1000% (strain sweep). In order to ensure that steady state conditions are reached, the non-linear response is only determined after at least 20 cycles per measurement are completed. The results generated at the strain of 1000% were used to calculate Large Amplitude Oscillatory Shear Non-Linear Factor (LAOS-NLF).

The Large Amplitude Oscillatory Shear Non-Linear Factor (LAOS-NLF) is defined by:

$$LAOS - NLF = \left| \frac{G'_1}{G'_3} \right|$$

where $G_1'$—first order Fourier Coefficient
$G_3'$—third order Fourier Coefficient More details concerning the measurement are given in 1. J. M. Dealy, K. F. Wissbrun, *Melt Rheology and Its Role in Plastics Processing: Theory and Applications*; edited by Van Nostrand Reinhold, New York (1990)
2. S. Filipe, Non-Linear Rheology of Polymer Melts, AIP Conference Proceedings 1152, pp. 168-174 (2009)
3. M. Wilhelm, Macromol. Mat. Eng. 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of *Annual European Rheology Conference*, 135 (2010), the documents (1) to (4) being incorporated by reference herewith.

i) Melt Strength and Drawability Test

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a throughput of 2.1 g/min with pressure before the gear pump of 100 bar, and the melt temperature was set to 200° C. The spinline length between die and Rheotens wheels was 100 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/s². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the melt strength and drawability values.

j) Short Term Pressure Resistance (STPR)

The pressure test on un-notched 32 mm SDR 11 pipes having a length of 450 mm is carried out in water-inside and water-outside environment according to ISO 1167-1:2006. End caps type A were used. The time to failure is determined in hours. A hoop stress of of 13.9 MPa and a temperature of 20° C. were applied.

k) Xylene Insoluble Content (XHI)

About 0.3 g of the polymer (m1) are weighed and put in a mesh of metal. The polymer and the mesh are weighed together (m2). The metal mesh (with polymer) is left in 700 ml boiling xylene for 5 hours in a 1000 ml round bottom flash under reflux. Thereafter the metal mesh (with polymer) is dropped directly into about 700 ml "fresh" xylene and boiled for another hour. Subsequently the mesh is dried under vacuum over night at 90° C. and weighed again (m3). The XHI (%) is calculated according to the formula below:

XHI (%)=100−((m2−m3)×100/m1)

l) Tensile Modulus

As a measure for stiffness, the tensile modulus (E-modulus) of the compositions was measured at 23° C. on compression molded specimens according to ISO 527-2:1993. The specimens (1B type) were milled from plaques of 4 mm thickness prepared by compression molding according to ISO 293:2004 using the conditions defined in chapter 3.3 of ISO 1872-2:2007. The modulus was measured at a speed of 1 mm/min.

m) Charpy Impact Strength

Charpy impact strength was determined according to ISO179/1eA:2000 on V-notched samples of 80*10*4 mm³ at 0° C. (Charpy impact strength (0° C.)). Samples were milled from plaques of 4 mm thickness prepared by compression molding according to ISO 293:2004 using the conditions defined in chapter 3.3 of ISO 1872-2:2007.

2. Compositions:

UHMWPE M2 homopolymer was purchased from Jingchem Corporation. It has a narrow, quite well defined Mv of 2,750 kg/mol by ASTM 4020-81 (denoted in material info from the supplier).

Properties of UHMWPE M2

| | Mv kg/mol | Density kg/m³ | Tm ° C. |
|---|---|---|---|
| UHMWPE M2 | 2,750 | 935 | 135 |

A bimodal high density polyethylene (PE1) was manufactured according to the following conditions.

| Prepolymerisation | | |
|---|---|---|
| Temperature | ° C. | 40 |
| Pressure | bar | 61 |
| Split | % | 2.0 |
| Loop | | |
| Temperature | ° C. | 95 |
| pressure | bar | 56 |
| MFR$_2$ | g/10 min | 450 |
| Density | kg/m³ | >970 |
| Split | % | 48 |

| -continued | | |
|---|---|---|
| GPR | | |
| Temperature | ° C. | 85 |
| Pressure | bar | 20 |
| C6/C2 ratio | mol/kmol | 29 |
| Split | % | 50 |
| Base resin | kg/m³ | 948 |
| MFR$_{21}$ | g/10 min | 9.0 |

Additives

The following additives were used in the reactive compounding step described below:

Antioxidant: Irganox® B225 (mixture of Irganox® 1010 and Irgafos® 168, available from Ciba-Specialty Chemicals), Acid scavenger: calcium stearate (CEASIT-AV/T, available from Baerlocher GmbH), The carbon black is added as a masterbatch (CBMB) containing 39.5 wt. % carbon black (Elftex TP, distributed by Cabot), 0.1 wt. % Irganox 1010 (from Ciba, now part of BASF) and 60.4 wt. % ethylene-butylene copolymer having a comonomer content of 1.7 wt. %, an MFR$_2$ (2.16 kg, 190° C., ISO 1133) of 30 g/10 min and a density of 959 kg/m³ in an amount of 5.75 wt. %.

Peroxide: Trigonox® BPIC-75 (0.4 to 0.7 wt.-% tert-butylperoxy isopropyl carbonate (CAS No. 2372-21-6), 75% solution in mineral spirits, commercially available from Akzo Nobel, NL), Example A The above-described bimodal high density ethylene polymers with or without the UHMW ethylene homopolymer M2 were reactively extruded in a parallel co-rotating twin-screw extruder (Theysohn TSK-N060). For extrusion on TSK-N060, a screw speed of 120 rpm and throughput rate of 50~60 kg/h were set for all compounding sequences. The extrusion temperature profile was adjusted according to extrudability of each sequence. The temperature of the two barrels next to the main hopper was set to lower than 50° C. Set temperatures of all other barrels varied from 200 to 240° C. In the inventive samples a peroxide masterbatch was added to induce LCB/cross-linking reaction during compounding.

The base resin PE1 together with the UHMWPE and the carbon black masterbatch CBMB was added into the main hopper of TSK-N060 (located at barrel 1, the most upstream barrel of the extruder). Peroxide was added into the melting zone by feeding the additive to the barrel next to the main hooper of TSK-N060. The antioxidant mixture and the calcium stearate were added directly upstream of the most downstream screw into the sider feeder of TSK-N060, within 25% of the length from the downstream end of the extruder

TABLE 1

Compounding recipe for reactive extrusion and reference

| | | | CE1 | IE1 | IE2 | IE3 | IE4 | IE5 |
|---|---|---|---|---|---|---|---|---|
| PE1 | bimod. HDPE | % | 93.88 | 88.78 | 88.68 | 83.78 | 83.68 | 93.68 |
| Irganox B225 | antioxidant | % | 0.22 | 0.22 | 0.22 | 0.22 | 0.22 | 0.22 |
| CEASIT-AV/T | Ca-stearate | % | 0.15 | 0.15 | 0.15 | 0.15 | 0.15 | 0.15 |

TABLE 1-continued

Compounding recipe for reactive extrusion and reference

|  |  |  | CE1 | IE1 | IE2 | IE3 | IE4 | IE5 |
|---|---|---|------|------|------|-------|-------|------|
| CBMB |  | % | 5.75 | 5.75 | 5.75 | 5.75 | 5.75 | 5.75 |
| M2 | UHMWPE | % |  | 5.00 | 5.00 | 10.00 | 10.00 |  |
| Trigonox BPIC-75 | peroxide MB | % |  | 0.1 | 0.2 | 0.1 | 0.2 | 0.2 |

Pipe Extrusion

Pipe extrusion was performed on a Krauss Maffei 45 single screw extruder with L/D ratio of 36. It has 5 cylinder zones, 6 tool zones and 2 vacuumed water bath tanks.

Extrusion conditions were as follows: melt temperature Tm: 215-240° C., screw speed 40~60 rpm, output 30~50 kg/h. The temperature in the cylinder zone 1~5 varied from 200 to 225° C. The sprayed water temperature in the water batch tanks was kept at 20° C.

Pipe Testing

The pressure test on un-notched 32 mm SDR 11 pipes having a length of 450 mm is carried out in water-inside and water-outside environment according to ISO 1167-1:2006. End caps of type A were used. The time to failure is determined in hours.

Pipe properties of multimodal polyethylene compositions according to the invention are shown in Table 2 in comparison to the comparative composition CE1.

TABLE 2

|  |  | CE1 | IE1 | IE2 | IE3 | IE4 | IE5 |
|---|---|------|------|------|------|------|------|
| MFR$_5$ | g/10 min | 0.3 | 0.07 | 0.04 | 0.05 | 0.05 | 0.01 |
| MFR$_{21}$ | g/10 min | 9.0 | 5.8 | 0.5 | 3.7 | 0.61 | 1.5 |
| Density | kg/m$^3$ | 859.5 | 956.6 | 956 | 955.3 | 955.3 | 955.8 |
| Eta-0.05 | Pa · s | 183,700 | 401,100 | 933,200 | 790,800 | 849,300 | 863,200 |
| Eta-300 | Pa · s | 1,139 | 1,273 | 1,337 | 1,684 | 1,474 | 1,315 |
| eta-0.05/eta-300 |  | 161 | 315 | 690 | 470 | 576 | 656 |
| XHU | % | 0 | 0.33 | 1.85 | 0.9 | 1.6 | 2.6 |
| Eta747 | kPa · s | 691 | 6,522 | 47,568 | 17,056 | 35,182 | 54,717 |
| Fmax | cN | 31 | 41 | 80 | 70 | 80 | 64 |
| Vmax | mm/s | 164 | 172 | 192 | 187 | 190 | 199 |
| LAOS-NLF |  | 1.33 | 2.85 | 5.72 | 3.38 | 3.94 | 6.69 |
| Pipe |  |  |  |  |  |  |  |
| 13.9 MPa/20° C. | H | <10 | 35 | 90 | 34 | 100 | 73 |

All compositions according to the invention prepared by reactive extrusion with/without presence of UHMWPE have improved melt strength (increased $F_{max}$ and $V_{max}$), creep resistance (increased Eta747) and pressure resistance than the reference CE1. This was achieved with only marginal increase in gel content (XHU) and reduction in density. The MFR of all materials are lower than CE1, however, due to pronounced shear thinning, viscosities in the high frequency range of most materials are not much higher than CE1 (Table 2). This means although the samples of the invention had substantially higher molecular weights, the processability was still comparable to the comparative sample CE1. Yet, the inventive samples show a surprising increase in rheological as well as mechanical properties as indicated above.

Example B

Two compositions were used for the reactive compounding step (Table 3). One is the composition used in the above CE1, the other is PE1 to which 10 wt. % of UHMWPE was mixed corresponding to the composition of IE3, but in Example B no peroxide was used so that non-crosslinked mixtures were obtained in the extrusion step.

The comparative compositions CE2 and CE3 were compounded in a parallel co-rotating twin-screw extruder ZSK 40. The polymer powder, the UHMWPE, the CBMB and all additives were premixed and fed into the main hopper at the most upstream zone for extrusion. The temperature of barrel 2 was set to 150° C. while that of all other barrels was set to 235° C.; a screw speed of 120 rpm and a throughput rate of 20 kg/h were set for all compounding sequences.

The inventive compositions IE6 and IE7 were compounded in a parallel co-rotating twin-screw extruder TSK-N060. A screw speed of 120 rpm and throughput rate of 50~60 kg/h were set for all compounding sequences. The temperature of the 2 barrels next to the main hopper was set to 180° C. Temperatures of all other barrels varied from 200 to 240° C. The base resin and 5.75% carbon black masterbatch (CBMB) containing 39.5 wt. % carbon black (Elftex TP, distributed by Cabot), 0.1 wt. % Irganox 1010 (from Ciba, now part of BASF) and 60.4 wt. % ethylene-butylene copolymer having a comonomer content of 1.7 wt. %, an MFR$_2$ (2.16 kg, 190° C., ISO 1133) of 30 g/10 min and a density of 959 kg/m$^3$ were fed into the main hopper that is located at barrel 1, the most upstream feeder of the extruder. The antioxidant and the calcium stearate were fed directly upstream of the most downstream screw into the side feeder of TSK-N060, within 25% of the length from the downstream end of the extruder.

From the above it is apparent that the composition for CE2 and IE6 were the same, as were the compositions of CE3 and IE7, respectively. The different characteristics and effects of the respective final products are based on the different processing in the compounding step of the compositions in the extruder, as described above.

The pipe extrusion was done in the same manner as in Example A. The conditions for the pipe testing were the same as in Example A as well. The ingredients of the compositions used for reactive extrusion are shown in Table 3 below and selected pipe properties of the obtained samples are shown in Table 4 below.

TABLE 3

Compounding recipes for reactive extrusion

|  |  |  | CE2 | CE3 | IE6 | IE7 |
|---|---|---|------|------|------|------|
| PE1 | bimod. HDPE | % | 93.88 | 83.88 | 93.88 | 83.88 |

TABLE 3-continued

Compounding recipes for reactive extrusion

| | | | CE2 | CE3 | IE6 | IE7 |
|---|---|---|---|---|---|---|
| Irganox B225 | antioxidant | % | 0.22 | 0.22 | 0.22 | 0.22 |
| CEASIT-AV/T | Ca-stearate | % | 0.15 | 0.15 | 0.15 | 0.15 |
| CBMB | | % | 5.75 | 5.75 | 5.75 | 5.75 |
| M2 | UHMWPE | % | | 10.00 | | 10.00 |

TABLE 4

| | | CE2 | IE6 | CE3 | IE7 |
|---|---|---|---|---|---|
| $MFR_5$ | g/10 min | 0.30 | 0.22 | 0.07 | 0.08 |
| $MFR_{21}$ | g/10 min | 8.97 | 11.80 | 3.15 | 4.84 |
| Eta747 | kPa·s | 691 | 2,169 | 1,957 | 4,874 |
| Eta-0.05 | Pa·s | 183,700 | 205,200 | 345,700 | 341,200 |
| Eta-300 | Pa·s | 1,139 | 1,005 | 1,472 | 1,277 |
| Eta-0.05/Eta-300 | | 161 | 204 | 235 | 267 |
| LAOS NLF | | 1.33 | 3.73 | 1.40 | 2.02 |
| XHU | % | 0 | 0 | 0.82 | 0 |
| Tensile modulus | MPa | 1,076.9 | 1,109.0 | 1,075.3 | 1,082.7 |
| | | | | Pipe | |
| 13.9 MPa/ 20° C. | h | <10 | 48 | n.d. | 29 |

The inventive examples show significantly improved eta747 shear viscosity (suggesting better sagging resistance) and similar MFR values to the comparative examples. This was achieved without increasing the gel content of the material or loss in stiffness that is normally linked to pressure resistance of PE100. The improvement in the sagging resistance is so effective that equivalent values are obtained for standard PE100 resin (IE6) and PE100 resin added with 10 wt. % UHMW PE (CE3) at much higher MFR values (much lower molecular weight facilitating processing of the resin). In comparison to the comparative materials produced with ZSK 40, the two inventive samples have higher viscosity in the low frequency region while lower viscosity in the high frequency region. Hence they have higher eta747 (signifying better creep resistance) and therefore enhanced resistance to sagging, but comparable or even better processability than the comparative materials. Moreover, the LAOS NLF values in Table 4 were much higher for the inventive materials IE6 and IE7 than for the comparative materials CE2 and CE3, suggesting that the inventive compositions have increased long chain branching and show pronounced non-linear behaviour.

Example C

High density polyethylene compositions were produced with two different prepolymerisation conditions. PE2 is a bimodal high density polyethylene which was produced with a prepolymerisation temperature of 70° C. and a prepolymeriser split of 1-2%. The target $MFR_5$ for the prepolymer was 10 g/10 min. The loop reactor was operated under supercritical conditions at 95° C. The target $MFR_2$ was 400 g/10 min. The loop reactor split was 50%. Both prepolymer and polymer produced in the loop reactor are homopolymers. The gas phase reactor was operated at 85° C. with 48% split. 1-hexene was used as comonomer so that the final powder density was targeted to 952.5 kg/m³. Final $MFR_5$ was target to be 0.20 g/10 min. The compounding of the samples CE4 and CE5 was done in a JSW CIM 460 extruder.

PE3 is a trimodal high density polyethylene which was produced with a prepolymerisation temperature of 50° C. and no $H_2$ was fed into the prepolymeriser. The final MFR of the prepolymer was not measurable. Based on the analysis of spot samples collected from the prepolymeriser, the prepolymer was an UHMW ethylene homopolymer having a $Mv \approx 3*10^6$ g/mol, with a split of about 1%. The loop reactor was operated at constant conditions ($H_2$ feed, temperature, $C_2$ partial pressure). The $MFR_2$ of the loop product under the above prepolymerisation conditions was ca. 150 g/10 min. There was slightly increased $H_2$ feed in the gas phase reactor to compensate for the lower loop MFR, otherwise the gas phase reactor conditions were the same as in the preparation of PE2.

The polymerisation catalyst used for preparing both polymers PE2 and PE 3 was prepared as follows. 87 kg of toluene were added into the reactor. Then 45.5 kg Bomag A (butyloctyl magnesium) in heptane were also added in the reactor. 161 kg 99.8% 2-ethyl-1-hexanol were then introduced into the reactor at a flow rate of 24 to 40 kg/h. The molar ratio between BOMAG-A and 2-ethyl-1-hexanol was 1:1.83.

330 kg silica (calcined silica, Sylopol® 2100) and pentane (0.12 kg/kg carrier) were charged into a catalyst preparation reactor. Then EADC (Ethylaluminum dichloride) (2.66 mol/kg silica) was added into the reactor at a temperature of below 40° C. during two hours and mixing was continued for one hour. The temperature during mixing was 40-50° C. Then the Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at a temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the final catalyst component is:
Al/Mg/Ti=1.5/1.4/0.8 (mol/kg silica).

The compounding of the samples IE 8, IE9, IE10, IE11, and IE12 was done in a TSK-N060 extruder as described above. In the compounding step of IE9, IE10, IE11 and IE12 a peroxide additive (Trigonox® BPIC-75) was used to facilitate long chain branching/crosslinking.

The base resin, together with peroxide (when needed), was mixed and added into the melting zone by feeding to the main hopper of TSK-N060. The antioxidant mixture, the carbon black masterbatch (CBMB) containing 39.5 wt. % carbon black (Elftex TP, distributed by Cabot), 0.1 wt. % Irganox 1010 (from Ciba, now part of BASF) and 60.4 wt. % ethylene-butylene copolymer having a comonomer content of 1.7 wt. %, an $MFR_2$ (2.16 kg, 190° C., ISO 1133) of 30 g/10 min and a density of 959 kg/m$^3$ in an amount of 5.75 wt. % and the calcium stearate (CEASIT-AV/T, supplied by Baerlocher GmbH) were added into the side feeder of TSK-N060, within 25% of the length from the downstream end of the extruder.

The ingredients and its amounts of the compositions used in Example C are shown in Table 5 below.

TABLE 5

| | | CE4 | CE5 | IE8 | IE9 | IE10 | IE11 | IE12 |
|---|---|---|---|---|---|---|---|---|
| PE2 | % | 93.88 | | | | | 93.78 | 93.68 |
| PE3 | % | | 93.88 | 93.88 | 93.78 | 93.68 | | |
| Irgafos 168 | % | 0.1 | 0.1 | 0.11 | 0.11 | 0.11 | 0.11 | 0.11 |
| Irganox 1010 | % | 0.07 | 0.07 | 0.11 | 0.11 | 0.11 | 0.11 | 0.11 |
| Irganox 1330 | % | 0.1 | 0.1 | | | | | |
| CEASIT-AV/T | % | 0.15 | 0.15 | 0.15 | 0.15 | 0.15 | 0.15 | 0.15 |
| CBMB | % | 5.75 | 5.75 | 5.75 | 5.75 | 5.75 | 5.75 | 5.75 |
| Trigonox BPIC-75 | % | | | | 0.1 | 0.2 | 0.1 | 0.2 |
| Extruder | | JSW CIM 460 | JSW CIM 460 | TSK-N060 | TSK-N060 | TSK-N060 | TSK-N060 | TSK-N060 |

The pipe extrusion was done in the same manner as in Example A. The conditions for the pipe testing were the same as in Example A as well. Pipe properties of the obtained samples are shown in Table 6.

TABLE 6

| | | CE4 | CE5 | IE8 | IE9 | IE10 | IE11 | IE12 |
|---|---|---|---|---|---|---|---|---|
| | | | | Pipe testing at 20° C. | | | | |
| 13.9 MPa Pipe | h | <10 | <10 | 490 | 3,000 | 1,090 | 510 | >1,201 |
| $MFR_5$ | g/10 min | 0.15 | 0.18 | 0.1 | 0.01 | 0 | 0.04 | 0.02 |
| $MFR_{21}$ | g/10 min | 6.12 | 7.02 | 6.4 | 1.82 | 1.08 | 5.19 | 4.19 |
| $FRR_{5/21}$ | | 40.8 | 39 | 64 | 182 | N.A. | 129.8 | 209.5 |
| PI | Pa$^{-1}$ | 3.2 | 3.4 | 5.5 | N.A. | N.A. | N.A. | N.A. |
| eta-0.05 rad/s | Pa · s | 235,000 | 206,400 | 277,000 | 584,900 | 831,000 | 349,300 | 826,600 |
| eta-300 rad/s | Pa · s | 1,269 | 1,191 | 1,230 | 1,149 | 1,125 | 1,254 | 1,471 |
| eta-0.05/eta-300 | | 185 | 173 | 225 | 509 | 739 | 278.55 | 561.93 |
| Eta747 | kPa · s | 808.5 | 736.8 | 3,175.7 | 29,031 | 48,185 | 6.61E+06 | 5.07E+07 |
| Density | kg/m$^3$ | 962.7 | 962.3 | 962.2 | 962.9 | 961.4 | 963.92 | 962.36 |
| Tensile modulus | MPa | 1,332.6 | 1,304.2 | 1,258.9 | 1,241.5 | 1,185.3 | 1194 | 1178.8 |
| Impact strength at 0° C. | kJ/m$^2$ | 22.7 | 22.1 | 19.7 | 15.8 | 16.0 | 18.34 | 16.76 |
| XHU | % | 0.01 | 0.1 | 0.01 | 4.2 | 9.99 | 0.22 | 4.64 |
| LAOS-NLF 1000% | | 1.49 | 1.2 | 2.19 | 4.55 | 6.54 | 2.65 | 4.79 |
| Fmax* | cN | 34.7 | 36.8 | 40 | 61.7 | 68.7 | 48.7 | 64.7 |
| vmax* | mm/s | 160 | 163 | 174 | 187 | 178 | 177 | 188 |

It can be seen from the above results that the inventive multimodal polyethylene compositions showed increased pressure resistance in the hydrostatic pressure test according to ISO 1167:2003 compared to the comparative compositions. The comparison between CE 5 and IE 8 shows the effect of adding the stabilizer and the acid scavenger only at approx. 22% of the length from the downstream end of the extruder (into the side feeder directly upstream to the most downstream screw), while in CE5 the additives were fed into the extruder jointly upstream at the main hopper. The composition of IE8 showed sharply increased eta747 value indicating an improved sagging resistance and creep resistance while its molecular weight was substantially higher (lower MFR). The increase in LAOS-NLF signifies an increased non-linear behavior. Addition of peroxide in the reactive extrusion step even improved the above results. Especially, the improvement in creep resistance, ratio of eta$_{0.05}$/eta$_{300}$ and LAOS-NLF are evident (IE11 and IE12).

The invention claimed is:

1. A multimodal polyethylene composition comprising a high density multimodal ethylene polymer component (A) having a density of at least 930 kg/m$^3$, and a MFR$_{21}$ of not more than 15 g/10 min,
wherein said composition exhibits a LAOS-NLF defined as $$LAOS-NLF = \left| \frac{G'_1}{G'_3} \right|$$

where G'$_1$—first order Fourier Coefficient
G'$_3$—third order Fourier Coefficient
of at least 1.7.

2. The multimodal ethylene polymer composition according to claim 1, which has a viscosity at a shear stress of 747 Pa (eta747) of 1,000 kPa·s or higher.

3. The multimodal polyethylene composition according to claim 1 whereby the polypropylene base resin has a F30 melt strength of 10 cN or higher at 200° C. measured according to ISO 16790:2005.

4. The multimodal polyethylene composition according to claim 1 having a ratio (eta$_{0.05}$)/(eta$_{300}$) of the complex viscosity, in Pa·s, at a frequency of 0.05 rad/s (eta$_{0.05}$), to the complex viscosity, in Pa·s, at a frequency of 300 rad/s (eta$_{300}$) of at least 190.

5. The multimodal polyethylene composition according to claim 1 obtainable by melt-mixing a high density multimodal ethylene polymer component (A) having a density of at least 930 kg/m$^3$, and a MFR$_{21}$ of not more than 15 g/10 min, and extruding said high density multimodal ethylene polymer component (A) in the presence of up to 10 wt. % of additives, based on the weight of the mixture so as to form said multimodal polyethylene composition.

6. The multimodal polyethylene composition according to claim 1 further comprising an ultrahigh molecular weight ethylene polymer component (B).

7. The multimodal polyethylene composition according to claim 6, wherein the ultrahigh molecular weight ethylene polymer component (B) has a nominal viscosity molecular weight (Mv) according to ASTM D 4020-05 in the range of from 1,000,000 to 6,000,000 g/mol.

8. Process for the production of a pipe comprising the steps of
   (a) melt-mixing a high density multimodal ethylene polymer component (A) having a density of at least 930 kg/m$^3$, and a MFR$_{21}$ of not more than 15 g/10 min,
   (b) extruding the high density multimodal ethylene polymer component (A) so as to form a multimodal polyethylene composition in the presence of up to 10 wt. % of additives, based on the extruded mixture, the multimodal polyethylene composition having an MFR$_{21}$ of not more than 15 g/10 min, a density of at least 925 kg/m$^3$ and a LAOS-NLF defined as $$LAOS-NLF = \left|\frac{G'_1}{G'_3}\right|$$

where G'$_1$—first order Fourier Coefficient
G'$_3$—third order Fourier Coefficient
of at least 1.7, and
   (c) forming said multimodal ethylene polymer composition into a pipe.

9. The process according to claim 8, wherein an ultrahigh molecular weight polymer component (B) is added to the melt-mixing step (a).

10. The process according to claim 8, wherein at least a part of the additives is added in step (b) at a position situated with 50% of the length from the downstream end of the extruder.

11. The process according to claim 8, wherein at least an antioxidant and/or an acid scavenger is added at a position situated within 50% of the length from the downstream end of the extruder.

12. A pipe comprising the multimodal polyethylene composition according to claim 1.

13. The pipe according to claim 12 having a hydrostatic pressure resistance according to ISO 1167-1:2006 with a failure time at 13.9 MPa stress and at 20° C. of at least 30 h.

14. A method for the production of a pipe wherein a multimodal polyethylene composition as defined in claim 1 is extruded and cooled.

* * * * *